United States Patent
Ruszkiewicz et al.

(10) Patent No.: US 11,326,637 B2
(45) Date of Patent: May 10, 2022

(54) FASTENERS FOR HIGH STRENGTH STEEL

(71) Applicant: SEMBLEX CORPORATION, Elmhurst, IL (US)

(72) Inventors: Brandt J. Ruszkiewicz, Glendale Heights, IL (US); Gene M. Simpson, Algonquin, IL (US)

(73) Assignee: SEMBLEX CORPORATION, Elmhurst, IL (US)

( * ) Notice: Subject to any disclaimer, the term of this patent is extended or adjusted under 35 U.S.C. 154(b) by 365 days.

(21) Appl. No.: 16/687,146

(22) Filed: Nov. 18, 2019

(65) Prior Publication Data

US 2021/0148396 A1    May 20, 2021

(51) Int. Cl.
*F16B 25/00* (2006.01)

(52) U.S. Cl.
CPC ...... *F16B 25/0042* (2013.01); *F16B 25/0021* (2013.01); *F16B 25/00* (2013.01)

(58) Field of Classification Search
CPC ............. F16B 25/0021; F16B 25/0031; F16B 25/0042; F16B 25/0047; F16B 25/0078; F16B 33/02; F16B 35/041; F16B 25/00
USPC ............ 411/386, 387.4, 411, 424–426
See application file for complete search history.

(56) References Cited

U.S. PATENT DOCUMENTS

| | | | | |
|---|---|---|---|---|
| 3,323,402 A | * | 6/1967 | Gowen, Jr. | F04B 53/101 411/411 |
| 3,504,722 A | * | 4/1970 | Breed | F16B 25/0078 411/168 |
| 3,934,444 A | * | 1/1976 | Simons | B21H 3/027 72/88 |
| 4,549,754 A | * | 10/1985 | Saunders | E21B 17/042 285/334 |
| 5,242,253 A | | 9/1993 | Fulmer | |
| 5,340,254 A | | 8/1994 | Hertel et al. | |
| 5,722,808 A | * | 3/1998 | Pritchard | F16B 33/02 411/366.3 |
| 9,200,661 B2 | | 12/2015 | Bosco | |
| 2003/0203068 A1 | * | 10/2003 | Wohlrab | B29C 45/6728 425/589 |
| 2006/0222475 A1 | * | 10/2006 | Breihan | E21B 17/042 411/411 |
| 2006/0263171 A1 | * | 11/2006 | Schwarz | F16B 25/0021 411/411 |
| 2009/0116929 A1 | * | 5/2009 | Shea | F16B 39/30 411/311 |
| 2015/0023761 A1 | * | 1/2015 | Pritchard | F16B 25/0021 411/411 |

\* cited by examiner

*Primary Examiner* — Roberta S Delisle
(74) *Attorney, Agent, or Firm* — Greer Burns & Crain Ltd.

(57) ABSTRACT

A fastener has a generally cylindrical shank and a driver at a first end of the shank. The shank has a thread having a first side and a second side opposed to the first side. The first and second sides form a compound angle between the shank and an apex where the first and second sides meet. The compound angle is formed by a body portion extending along the first and second sides from the shank to an intersection, and a crest portion extending along the first and second sides from the intersection to the apex. The first and second sides in the body portion form a body angle with respect to each other, and the first and second sides in the crest portion form a crest angle with respect to each other. The crest angle is greater than the body angle.

8 Claims, 2 Drawing Sheets

FASTENERS FOR HIGH STRENGTH STEEL

This invention relates to fasteners, and more particularly, to fasteners for high strength steel.

BACKGROUND OF THE INVENTION

The growth and popularity of higher strength steels (for example, High Strength Low Alloy (HSLA), Advanced High Strength Steels (AHSS), etc.) has allowed for assemblies such as automotive seat frames and bases to be made with thinner material because these steels are stronger than previously used materials. Such higher strength materials are advantageous because they have higher strength characteristics and lower overall ductility as well as reduced weight.

Typical thread forming fasteners (those creating their own threads during assembly) do not perform adequately when used in the new steels, because the mating material does not provide adequate ductility allowing for typical thread designs to successfully form threads in the mating material. As a result, performance during assembly can be very inconsistent and result in poor clamp load being achieved, loose joints and damage to the threaded product.

Thus, there is a need for a thread forming design which can consistently be used in high strength steels without thread deformation or damage.

SUMMARY OF THE INVENTION

In keeping with one aspect of this invention, a fastener has a generally cylindrical shank having a central longitudinal axis, and a driver at a first end of the shank. The shank is tapered over some portion from the driver toward a tip on a second end of the shank opposite to the first end.

The shank has a thread encircling the shank from the general area of the first end to the second end in a helical manner. The thread consists of two different thread angles stacked on top of each other, creating a compound thread angle for the thread form. The thread angles are formed by a first side and a second side opposed to the first side. The thread form closest to the axis of the shank forms a base angle. The base angle is formed by a base portion extending along the first and second sides from the shank to an arbitrary intersection. A thread form on top of the base angle forms a crest angle. The crest angle is formed by a crest portion extending along the first and second sides from the intersection to the apex. The crest angle is greater than the body angle.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
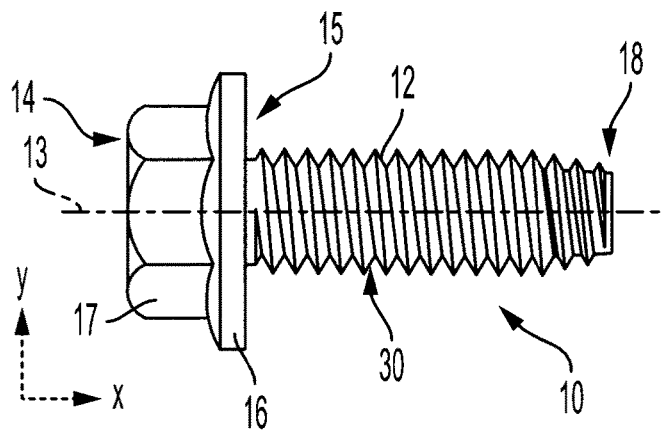
FIG. 1 is a plan view of one embodiment of a fastener of the present invention.
Figure 2:
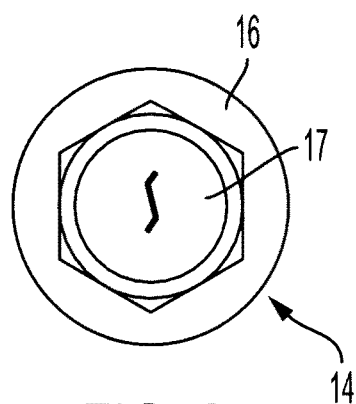
FIG. 2 is a plan view of the head on one end of the fastener of FIG. 1.

As seen in FIG. 1, a fastener 10 has a shank 12 and a driver 14 at a first end 15 of the shank 12. The shank 12 has a longitudinal axis 13. The driver 14 is shown as a hex head 17 and flange 16. The driver 14 could also be an alternative design or a threaded or unthreaded stud.

Figure 4:
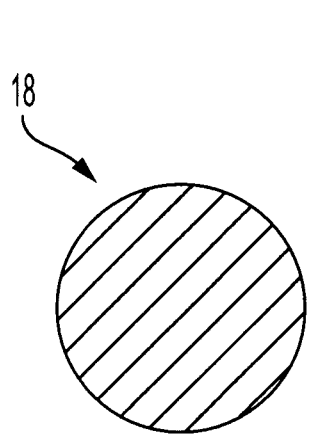
FIG. 4 is an end view of a second end of the fastener of FIG. 1.

The shank 12 is tapered at some point towards a second end 18 of the shank 12. The second end 18 can be flat, as seen in FIG. 1 and FIG. 4, or a tip 19, as in FIG. 5. The tip 19 can be a sharp point or a partially formed point.

The shank 12 has a thread 30 extending outwardly from the shank 12. The thread 30 can extend from the first end 15 to the second end 18, or the thread can start at a place removed from or distant from the first end 15.

The thread 30 has first and second sides 34, 36 which are spaced at the shank 12 and are angled towards each other until they meet at an apex 38. The sides 34, 36 are angled towards each other in a compound angle, as will be described.

Figure 3:
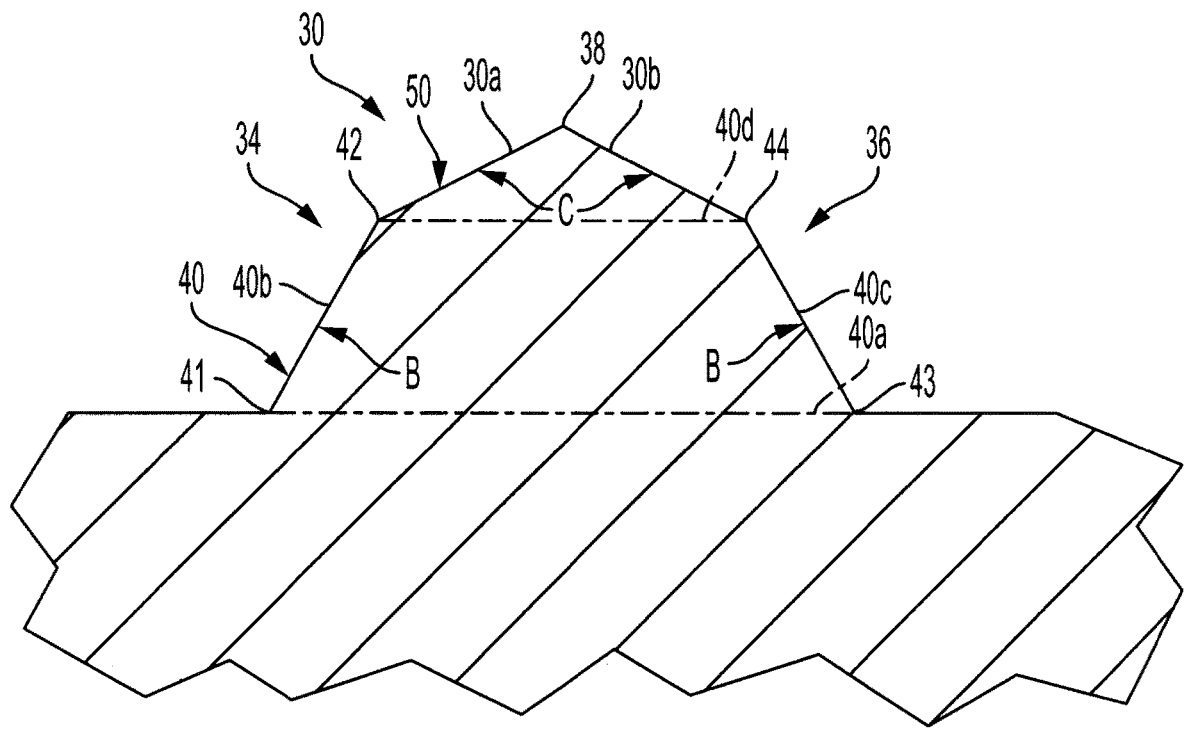
FIG. 3 is a detailed cross-sectional view of the thread form of the thread in the fastener of FIG. 1.

The compound angle is formed by a generally trapezoidal body portion 40 extending along the first and second sides 34,36 from the shank 12 to intersections 42, 44, respectively, and a generally triangular crest portion 50 extending along the first and second sides 34, 36 from the intersections 42, 44 to the apex 38. The intersections 42, 44 can be fairly sharp, as in FIG. 3, or rounded.

The body portion 40 is defined generally by an imaginary line 40a between starting points 41, 43 of the sides 34, 36, respectively, at the shank 12, a side portion 40b of the side 34, a side portion 40c of the side 36, and an imaginary line 40d between the intersections 42, 44. The crest portion 50 is defined generally by the imaginary line 40d, a portion 30a of the side 34 between the intersection 42 and the apex 38, and a portion 30b of the side 36 between the intersection 44 and the apex 38.

The side portions 40b, 40c form a body angle B with respect to each other, and the side portions 30a, 30b in the crest portion 50 form a crest angle C with respect to each other. The crest angle C is greater than the body angle B. The crest angle C can be in the range of about 90 to about 140 degrees, and the body angle B can be in the range of about 30 degrees to about 80 degrees. A preferred ratio C/B is 2.

Figure 5:
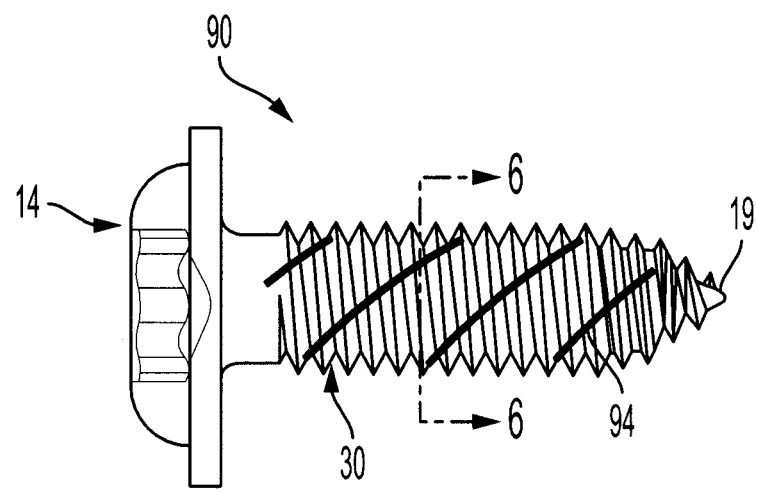
FIG. 5 is a side view of a second embodiment of the fastener of the present invention, having a lobular shaft and a tip at the second end.
Figure 6:
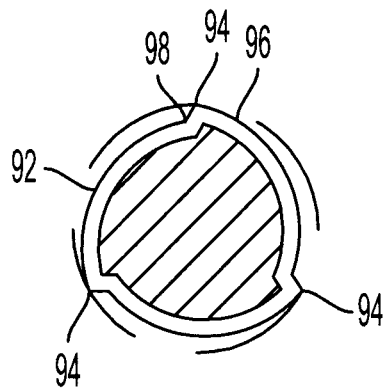
FIG. 6 is a sectional view of the base of the fastener of FIG. 5, taken along lines A-A.

FIGS. 5 and 6 show a second embodiment of the fastener 10 that includes a lobular shaft described in U.S. Pat. No. 5,242,253, which is hereby incorporated by reference in its entirety. A fastener 90 (FIG. 5) includes the threads shown in FIG. 3, but the shank has 3 lobes 94. Each lobe 94 has an elongated leading leg 96 that spirals around the shank, progressing gradually away from the first end 15 of the shank in the direction of turning. Each lobe 94 also has a trailing leg 98 which abruptly turns inwardly towards the shank axis and is shorter than a leading edge leg 96. Lobes 94 are therefore non-symmetrical.

While the principles of the invention have been described above in connection with specific apparatus and applications, it is to be understood that this description is made only by way of example and not as a limitation on the scope of the invention.

What is claimed is:

1. A fastener comprising:

a generally cylindrical shank having a central longitudinal axis, and a driver at a first end of the shank, the shank being tapered toward a second end of the shank opposite to the first end, the shank further having a thread extending outwardly from the shank, the thread encircling the shank in a helical manner, the thread having a first side and a second side opposed to the first side, the first and second sides forming a compound angle between the shank and an apex at the second end, the compound angle being formed by a body portion extending along the first and second sides from the shank to an intersection, and a crest portion extending along the first and second sides from the intersection to the apex, wherein the first and second sides in the body portion form a body angle with respect to each other, the first and second sides in the crest portion form a crest angle with respect to each other, and the crest angle is greater than the body angle.

2. The fastener of claim 1, wherein the crest angle is about two times the body angle.

3. The fastener of claim 1, wherein the crest angle is between 90 degrees and 140 degrees.

4. The fastener of claim 1, wherein the body angle is between 30 degrees and 80 degrees.

5. The fastener of claim 1, wherein the thread extends from the first end to the second end.

6. The fastener of claim 1, wherein the second end is flat.

7. The fastener of claim 1, wherein the second end is a tip.

8. The fastener of claim 1, wherein the shank has at least one lobe.

* * * * *